A. A. Hibberd.
Saw-Set.
Nº 36,462.  Patented Sept. 16, 1862.
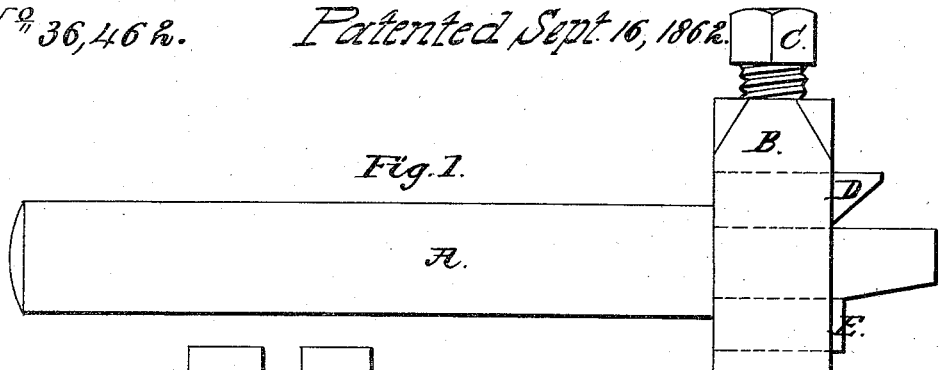
Fig. 1.
Fig. 6.
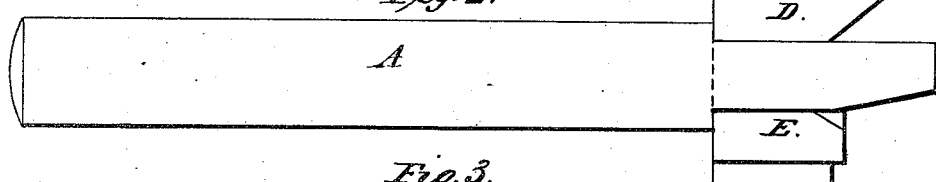
Fig. 2.
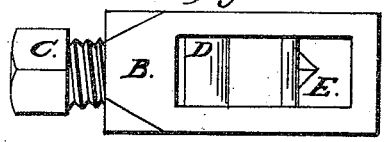
Fig. 3.
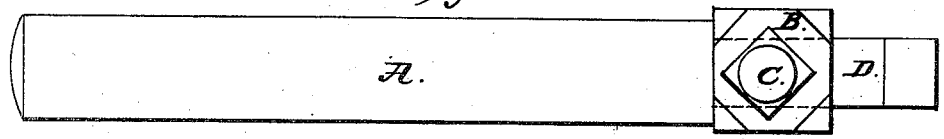
Fig. 4.
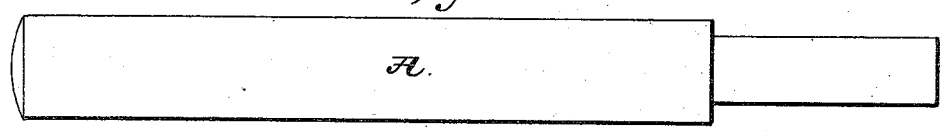
Fig. 5.
Witnesses:
Richard L. Charles.
William H. Page.
Inventor:
A. A. Hibberd.

UNITED STATES PATENT OFFICE.

ABIATHE A. HIBBERD, OF HERMITAGE, NEW YORK.

IMPROVEMENT IN MACHINES FOR SETTING AND UPSETTING SAWS.

Specification forming part of Letters Patent No. 36,462, dated September 16, 1862.

*To all whom it may concern:*

Be it known that I, ABIATHE ASHLEY HIBBERD, of the village of Hermitage, in the county of Wyoming and State of New York, have invented a new Improvement in Machines for Setting and Upsetting the Teeth of Mill and Crosscut Saws, also Circular Saws for Ripping and Crosscutting; and I do hereby declare that the following is a full, clear, and exact description of the construction and operation of the same, reference being had to the annexed drawings, making a part of this specification, in which—

Figure 1 is an elevation; Fig. 2, a section through the center; Fig. 3, an end showing clasp, dies, and guide or handle; Fig. 4, a plan; Fig. 5, a handle or guide; Fig. 6, dies.

The same letters indicate the same parts in all the figures.

A is a handle or guide; B, clasp for holding all together; C, set-screw in clasp B; D, die for mill-saw and circular saw for ripping; E, die for crosscutting saws, either straight or circular.

The construction of said set and upset is as follows: The handle or guide A is forged from three-quarter inch octagon cast-steel about six and one-half inches long, with one end made one-half inch square and about one and one-half inch long, the side next to E tapered, commence one inch from the shoulder and taper so as to leave the end one-half inch wide and seven-sixteenths thick, leave shoulders square to prevent the dies and clasp from slipping while being used. The clasp B is made of the best refined iron two inches long and seven-eighths inch square, with mortise through one and one-fourth inch long and one-half inch wide, one end being left one-half inch thick to insure strength of nut for set-screw C. The set-screw C is made of steel with thread five-eighths inch long and one-half inch diameter, with head one-half inch square. The die D is made of cast-steel one-half inch wide, three-eighths thick, and one and one-fourth inch long, with the side at one end beveled to an angle of about fifty degrees, or any other angle that will suit mill and circular saws for ripping better. The die E is forged the same size of D—one inch long with triangular groove in one side at the end in the center, so as to form a point when it is connected with the guide A. The dies and guide are all hardened the usual way and the temper drawn to a straw color in order to prevent their being bruised in the operation of setting and upsetting.

The above-described tool or machine is a proper size for the heaviest saws. One much smaller would be required for small saws with fine teeth.

When all is finished, as above described, then put the die E on the tapered side of the guide A, and the die D opposite put on the clasp B and set-screw C, and screw tight together, as represented in Fig. 1, and it is ready for use, which is as follows: After the tooth is filed to a proper shape, place the tool onto the point of the tooth, with the set-screw C up, then strike the opposite end with a light hammer until the tooth is sufficiently wide on the point or edge for cross-cutting saws, use the die E with the triangular groove, placing the guide on the face of the tooth and strike with a light hammer, as before, until the edges are brought out level and the desired set given to the tooth.

All saws wear on the outside of the tooth. Therefore the object of this machine is to keep the outside of the tooth straight and the edges flush, so as to insure their running free through the timber.

I am aware that there have been upsets for mill-saws, but differently constructed. They were made solid—that is, the die D and handle or guide A were one piece, and it is impossible to keep an acute angle where the edge or point of the saw-tooth comes in contact while upsetting. Consequently there is a very important part lost, the point of the tooth is dulled in the operation and requires filing a second time, which leaves a rough wire-edge and the point soft, while my mode of upsetting leaves the point sharp, smooth, and hard. Therefore it will stand much longer without refiling.

What I claim as my invention, and desire to secure by Letters Patent, is—

The dies D and E and their arrangement, substantially as and for the purpose specified.

A. A. HIBBERD.

Witnesses:
R. L. CHARLES,
W. H. PAGE.